T. O. BATES.
MACHINERY FOR MAKING CUP WAFERS, SUGAR WAFER BISCUITS, AND THE LIKE.
APPLICATION FILED SEPT. 24, 1909.

949,817.

Patented Feb. 22, 1910.

3 SHEETS—SHEET 1.

WITNESSES
W. P. Burg
A. F. Heuman

INVENTOR
Thomas Owen Bates
BY
[signature]
ATTY.

T. O. BATES.
MACHINERY FOR MAKING CUP WAFERS, SUGAR WAFER BISCUITS, AND THE LIKE.
APPLICATION FILED SEPT. 24, 1909.

949,817.

Patented Feb. 22, 1910.

3 SHEETS—SHEET 2.

WITNESSES
W. P. Burk
A. F. Heuman

INVENTOR
Thomas Owen Bates
BY
ATTY

T. O. BATES.
MACHINERY FOR MAKING CUP WAFERS, SUGAR WAFER BISCUITS, AND THE LIKE.
APPLICATION FILED SEPT. 24, 1909.

949,817.

Patented Feb. 22, 1910.

3 SHEETS—SHEET 3.

INVENTOR
Thomas Owen Bates

WITNESSES

UNITED STATES PATENT OFFICE.

THOMAS OWEN BATES, OF LIVERPOOL, ENGLAND.

MACHINERY FOR MAKING CUP-WAFERS, SUGAR-WAFER BISCUITS, AND THE LIKE.

949,817. Specification of Letters Patent. Patented Feb. 22, 1910.

Application filed September 24, 1909. Serial No. 519,343.

*To all whom it may concern:*

Be it known that I, THOMAS OWEN BATES, a subject of the King of Great Britain and Ireland, residing at Springfields, St. Anne Street, Liverpool, England, have invented certain new and useful Improvements in Machinery for Making Cup-Wafers, Sugar-Wafer Biscuits, and the Like; and I do hereby declare the following to be a full, clear, and exact description of the invention, such as will enable others skilled in the art to which it appertains to make and use the same.

This invention has reference to machinery for making cup wafers of various shapes, sugar wafer biscuits, and the like; and it relates more particularly to that type of machine in which a rotary part containing a plurality of sets of externally heated cooking molds, plates or devices, are mounted on a revolving body or part, and are adapted to be brought into operation, intermittently, through the medium of a slotted disk and a hand operated lever or levers, in conjunction with a reciprocated liquid supply device having pumps for supplying the liquid to the mold.

Figure 1:
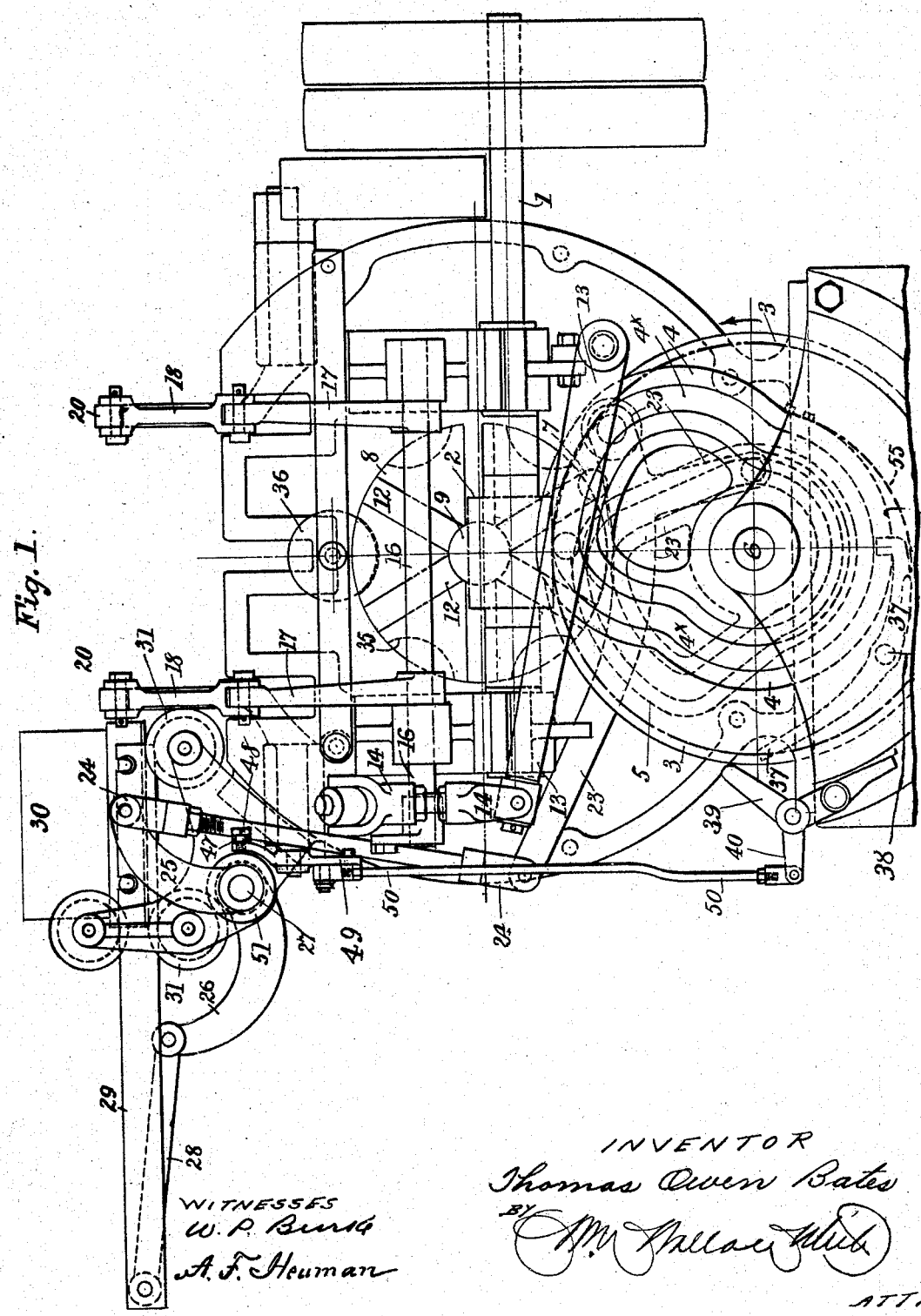
Figure 2:
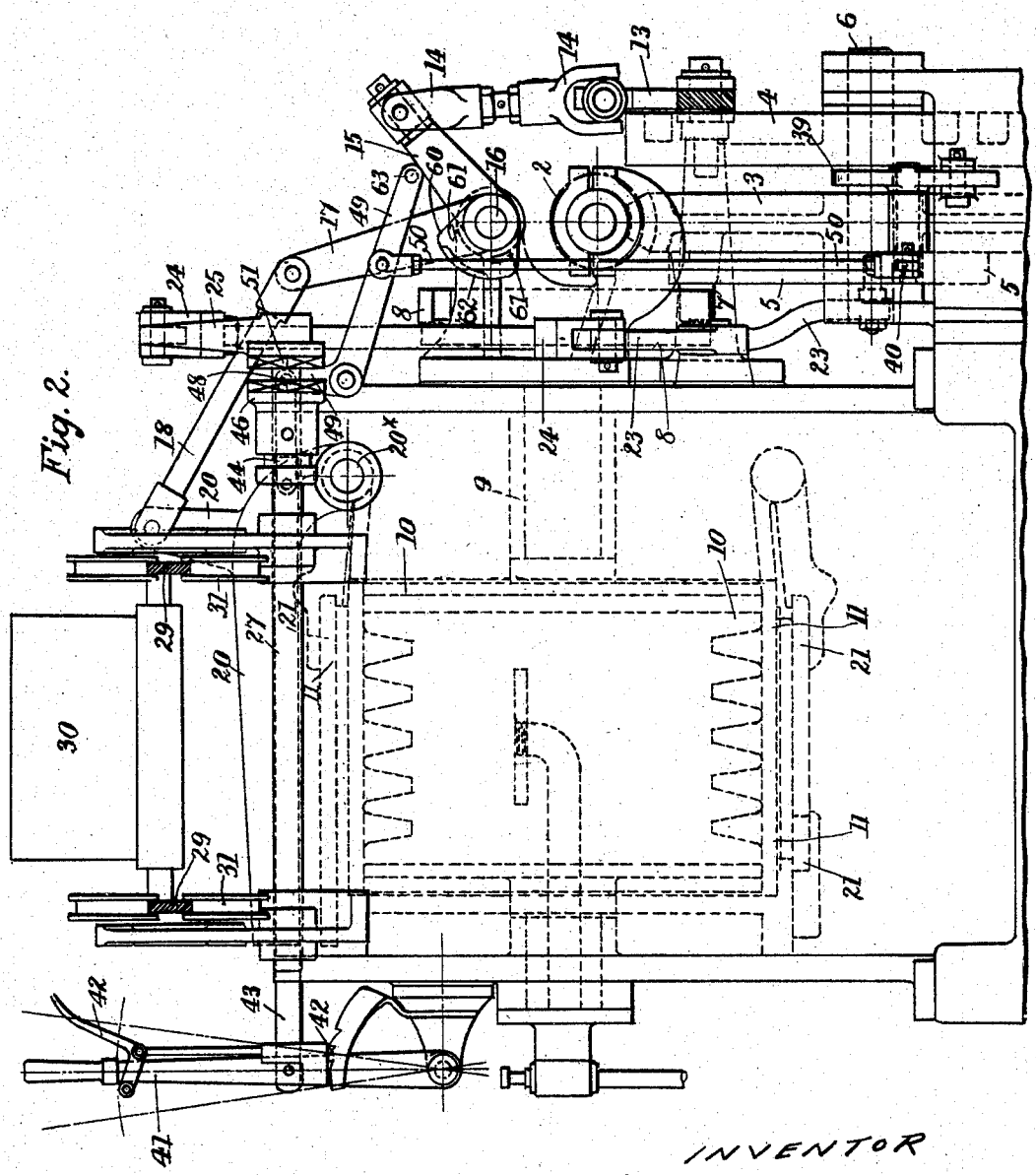
Figure 3:
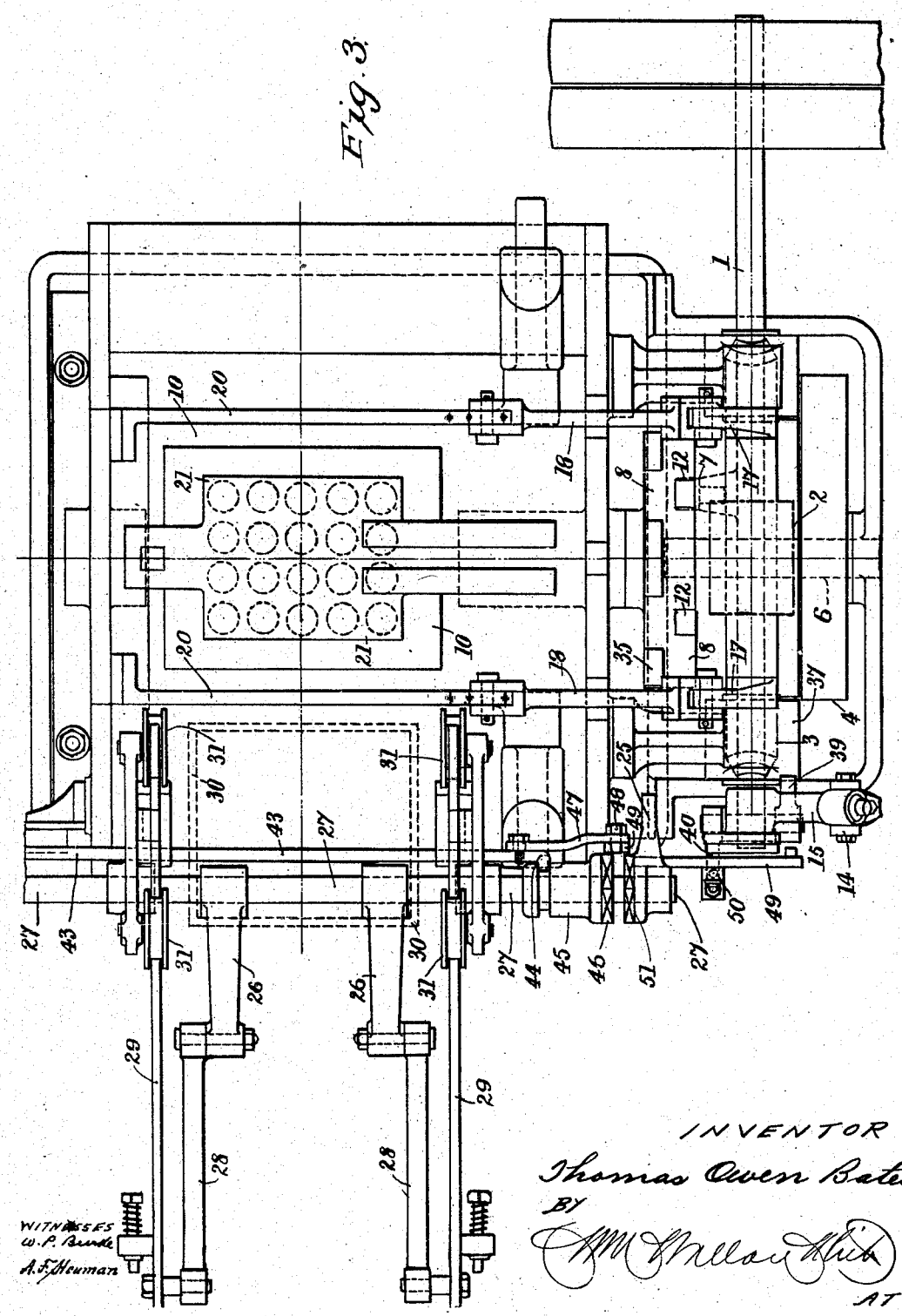

In the drawings, Figure 1 is a front elevation, Fig. 2 is a side elevation; and Fig. 3 is a plan of the machine.

The machine is wholly worked by power, which is transmitted through the primary driving shaft 1, and worm gearing, comprising a worm 2 and worm wheel 3, (the latter of which is rotated in the direction indicated) to the actuating parts of the machine, which comprise cams 4 and 5, which are mounted on the axle 6 of the worm wheel 3. On this worm wheel there is a pin or projection 7, which is adapted to engage with a disk or wheel 8 mounted on a shaft 9 which carries a known form of multiple mold or matrix plates or body 10, in which the goods are cooked, and which is adapted to be revolved, so as to bring after a period of rest, one of the plates or sets of molds 11 to the top of the machine, making thus a partial revolution, equal to the pitch apart of these sets of plates or molds, which, say, are six in number. This wheel or disk is provided in its face with radial slots or ways 12, or their equivalent, into which the pin 7 passes in its revolution, and so engages the disk or wheel 8; and then having engaged it, moves it a partial revolution, say, 1/6th, so giving the cooking body an equivalent movement; after which it leaves it. After the pin 7 on the worm 3 has so left the slotted disk 8, the working plates or body 10 remain in the position to which they have been moved, until the pin 7 again comes around; and one of the cams referred to, viz., cam 4 with a groove $4^x$ in its face, actuates a lever or connection 13, and lifts through connecting rods, levers, and shaft, 14, 15, 16, 17, and 18, an arm or lever 20, which is adapted to engage with and lift up the top or outer hinged movable plate 21 of the cooking plates 11 (and which generally constitute a male mold), and so opens the parts, so that the cooked articles can be removed, and the matrices or mold recharged automatically. The successive engagement between the lever 20 and the several plates constituting parts of each of the cooking molds, is effected during the partial rotations of the cooking chamber, by known means; such means consisting of a hook catch device on each plate which is adapted to be held in engagement with a part of the cooking chamber throughout its revolution, excepting when each plate arrives at the top position, and in arriving at this position, the hook catch, as well as the plate, are automatically engaged with the lever 20 and parts connected therewith, and during such engagement, the hook catch is released from its locking mechanism on the cooking chamber and permits the plate 21 to be raised by the lever 20, parts connected with it, and the cam actuated mechanism. After the plate 21 has been raised and lowered, and the cooking chamber caused to begin its partial rotation, the hook catch is again moved to the locked position and held so, until the plate to which it is attached arrives again at the top position. The pivot bearing of the lever 20 is so arranged as to be coincident with the hinge of each of the plates 21 when they arrive at the top position; while such hinge portions are adapted to clear the pivot bearing in the partial rotations of the cooking chamber. The groove or race $4^x$ of this cam 4 is so shaped that when said pivoted arm 20 (of which $20^x$ are the pivots) and with it the top plate 21 of the mold is raised, it gives a long pause to the parts, everything being stopped except the driving gear wheels and this cam 4; and during this pause produced by this cam, the other cam 5 comes into action, and acts upon a horned or bell crank lever (or other motion transmitting means) which, through connections 23, 24, 25 and 26—the latter operating about the shaft 27—and link 28, actuates the filling or charging mechanism 30—which is of any known suitable kind—the action of which is, first, to move longitudinally from the position of rest to the matrices 11, then supply simultaneously the fluid to the various matrices or molds, and then move longitudinally back again to its normal position, which, say, is at the side of the machine, as shown in the drawings. The motion levers and connecting rods, 24, 25, 26, and 28, give longitudinal movement to a carriage or frame 29 carrying the reservoir filling apparatus 30, which, say, will run on stationary wheels or rollers 31. In the first action, the filling device 30 is slid or run bodily forward over the molds 11, that is, the inner or female mold; and then when it gets near the end of the stroke, a lever or the like on a part of the filling apparatus, say a shaft of such apparatus, comes in contact with a stop which holds a slide or valve in the filling or charging apparatus, and so uncovers the several chambers of the slide or valve, allowing the contents of these several chambers to fall into the matrices or molds in the cooking plate, such material having been fed to them from a receptacle or container on the top in another part of the operation, and being cut off by the slide, when such slide is thus opened below to supply or empty the charges in the molds or matrices. This kind of multiple liquid charging or filling mechanism being well known, requires no special description. When the filling apparatus has been thus actuated, the cam through its form of groove or way, gives a slight pause to the horned part of the lever 23 which it actuates, that is to say, keeps it in the position to which it has been moved by it, so as to allow the drippings to fall from the receptacles of the filling mechanism 30 into the molds 11; and then the whole filling apparatus 30 is returned by the cam 5 and gearing referred to, back out of the way to its normal position shown in the drawings; and upon nearing the end of the return or outer stroke, the lever or part referred to on the said shaft returns the slide or valve to the position in which the various chambers in it will be filled from the fluid container. As soon as this operation is finished by the cam 5, the groove or race 4$^x$ of the other cam 4 for actuating the top or outer plate 21—which is now open and held open by the hinged lever 20—comes into action again, and it is so formed as to move the said hinged lever 20 down, and with it the outer or top plate 21, and so close the mold plate, which will be held and locked in this position until it comes around again. These locking, engaging and disengaging devices connected with rotary cooking devices of the kind referred to are well known, and require no special description. When the movement of the outer or top plate is completed, the pin 7 in the worm wheel 3 will again come into action on the cooking or mold body disk 8 having the grooves or ways 12 in it, and will turn it around a partial revolution in the manner above described, and the cycle is completed. This disk or wheel 8 may have recesses 35 in its periphery, into which a weighted roller or wheel 36, or the like, will drop when the disk has been moved from one stage to another; and so it will be held in this stage or position during the time the pin 7 on the worm wheel is out of engagement with it; that is, out of a slot or groove 12; while when it is moved, the spring-pressed or weighted wheel 36 will be moved upward out of said recess.

The driving of the outer or top plate actuating cam 4, from the worm wheel 3, is effected through a latch or catch device 37, which is hinged at 38 to the worm wheel 3, and normally engages with the cam 4, but it is adapted to be disengaged when desired therefrom, so that the outer or top plates 11 will not be opened and shut, that is, actuated, when it is so desired. At these times, the latch 37 is caused to come into contact with a stationary hinged or like stop 39, which, at the will of, and by the attendant, is moved by a lever 40, so as to come in the path of the latch 37, and remove it from the cam 4, the cam being held in its position of rest owing to the friction which occurs between the pin working in the groove 4$^x$ bearing against the surface of the latter. The duration of time of resting or stopping of the cam is dependent upon the movement of the hand operated lever 41 and the rotation of the worm wheel 3, as once the latch 37 is disengaged from the cam, the worm wheel must make a complete rotation before engagement can be again effected, and this can be effected by operating the hand lever at the predetermined time as hereinafter described.

The lever 40 may be operated by the attendant by a hand lever 41 with a ratchet or like engaging or disengaging mechanism 42, through a connecting rod 43, the end of which has a fork 44, or the like, which grasps the barrel 45, of a clutch portion 46 on the shaft 27, and also carries a connecting link 47 connected with a pin 48 and also with a bell crank lever 49 which is coupled up with the lever 40 by rod 50; so that the said stop lever 40, and hand lever and clutch device, are interconnected. When the lever 41 is pulled back so that the clutch portion 46 is pulled away from the clutch portion 51, the stop or trip device 39 will be thrown into its active position, so as to disengage the latch 37 from the cam 4, which will thereupon stop; on the other hand, when the lever 41 is moved in the opposite direction, it moves the trip device 39 outward, and the latch 37 will be pressed by a spring 55 into engagement with the cam 4 again; and at the same time it will move the clutch 46 into engagement with the clutch 51, and so when the lever 25 is rocked by its actuating cam and gear, the clutch portion 45 (which is fixed on the shaft 27) will be revolved a partial revolution and will operate the filling gear 30.

As thus far described, it will be possible to actuate the filling or charging mechanism when the outer or top mold plate is closed; and it is also possible at the same time to arrest the movement of the filling or charging mechanism when the said plates are in movement. These in this machine, are prevented; and such prevention is effected through a species of locking means connected with the movement mechanism of the plates 21, and that of the latch stop 39, operated by the hand lever 41. Namely, in connection with a rotative reciprocating part of the plate moving mechanism, viz., the bell crank lever shaft 16, there is employed a quadrant device 60 with projections 61, 62 on it forming a circular way between them, the projections 61 having gaps or spaces between them, and these gaps are so placed, that they operate in connection with a pin 63 or the like on the bell crank lever 49, and when the pin 63 is within and engaged by the projections, it is impossible to put the clutch 46 (which works the filling gear or apparatus) into engagement with the clutch 51, unless the mold plate operating cam is in operation; owing to the projections 61 and 62 engaging with the pin 63 on the bell crank lever. If reference is made to the drawings and the description referring to the oscillation of the shaft 16, it will be understood that the cam 60 is also oscillated as it is mounted on the shaft 16, and during this oscillation the projections 61, 62, cross the path of the pin 63 when the bell crank lever 49 is moved by the hand lever 41, so that such lever can only be operated during the partial rotation of the shaft 16 (that is when the cover 21 is being moved) as it is only during this movement that the pin 63 can pass between one or other of the projections 61 and the projection 62. On the other hand, the projections 61, 62, on the quadrant 60, are also so placed as to prevent the bell crank lever 49 from being withdrawn, when the said plates 21 are open. It is always required that the filling apparatus should be stopped before the machine as a whole is stopped, and the side of the way of the quadrant 60 effects this; that is, it prevents both the clutch 46 and the latch 37 above referred to, being taken out of gear.

The operation of the machine, the speed of which is dependent upon the power employed, is regulated by the cams which effect the movement of the baking chamber, the cover, and the reservoir filling mechanism, the operation being such that after the chamber is heated the machine is brought into operation by causing the cover to be raised or opened by moving the hand lever to its first position, and during this raising to move the hand lever to the second position for bringing into gear the clutch mechanism for coupling up the filling mechanism, which is caused to be moved over and above the matrices after the cover has been raised and a period of time allowed to elapse (for the removal of cooked wafers or the like); after the charging of the matrices has been effected the reservoir filling mechanism is moved back clear of the cover and this is closed. It will be understood that the various movements are effected in their order and time by the cam mechanism employed.

What is claimed is:—

1. In a machine for making cup wafers, sugar wafer biscuits, and the like, the combination of a rotatable cooking chamber having molds and covers, the latter capable of being automatically opened and closed; gearing for rotating the cooking chamber; a mold cover actuating cam having a shaft on which it is free to rotate; means for connecting and disconnecting the mold cover cam to and from the gearing; levers capable of automatically engaging with and unlocking the mold covers as they approach the top position; mechanism connected with the levers and actuated by the mold cover actuating cam; a liquid reservoir capable of being moved to and from a position directly above the cooking molds; stop devices for opening and closing the liquid reservoir; a rotatable liquid reservoir actuating cam arranged on the same shaft as the mold cover actuating cam; rotatable clutch mechanism; links connecting the clutch mechanism and the liquid reservoir; and levers connected with the clutch mechanism and operated by the reservoir actuating cam.

2. In a machine for making cup wafers, sugar wafer biscuits and the like, the combination of a rotatable cooking chamber having molds and covers, the latter capable of being automatically opened and closed; worm and worm wheel gearing for rotating the cooking chamber; a worm wheel shaft; a pivotally mounted latch on the worm wheel; a rotatable mold cover actuating cam capable of being engaged and disengaged with the latch, and freely mounted on the worm wheel shaft, levers capable of automatically engaging with and unlocking the mold covers as they approach the top position; mechanism connected with the levers and actuated by the mold cover actuating cam for opening and closing the mold covers; a liquid reservoir capable of being moved to and from a position directly above the cooking molds when the mold covers are raised; stop devices for opening and closing the liquid reservoir; a rotatable liquid reservoir actuating cam arranged on the same shaft as the mold cover actuating cam; rotatable clutch mechanism; links connecting the clutch mechanism and the liquid reservoir; levers connected with the clutch mechanism operated by the reservoir actuating cam; and means for engaging and disengaging the clutch mechanism.

3. In a machine for making cup wafers, sugar wafer biscuits, and the like, the combination of a rotatable cooking chamber having molds and covers, the latter capable of being automatically opened and closed; worm and worm wheel gearing for rotating the cooking chamber; a worm wheel shaft; a pivotally mounted latch on the worm wheel; a rotatable mold cover actuating cam capable of being engaged and disengaged with the latch, and freely mounted on the worm wheel shaft; levers capable of automatically engaging with and unlocking the mold covers as they approach the top position; mechanism connected with the levers and actuated by the mold cover actuating cam for opening and closing the mold covers; a liquid reservoir capable of being moved to and from a position directly above the cooking molds when the mold covers are raised; stop devices for opening and closing the liquid reservoir; a rotatable liquid reservoir actuating cam arranged on the same shaft as the mold cover actuating cam; rotatable clutch mechanism; links connecting the clutch mechanism and the liquid reservoir; levers operated by the reservoir actuating cam and connected with the clutch mechanism; a hand actuated lever for engaging and disengaging the clutch mechanism; locking mechanism for preventing the separate mechanisms actuating the mold covers and the liquid reservoir from being actuated other than in the predetermined order; and means connected with the hand actuated lever and capable of disengaging the latch from the mold cover actuating cam, and capable of co-acting with the locking mechanism.

4. A machine for making cup wafers, sugar wafer biscuits and the like, comprising the combination of a rotatable cooking chamber having a hollow shaft, and molds and covers, the latter capable of being automatically opened and closed; means for heating the cooking chamber; worm and worm wheel gearing; a grooved disk on the hollow shaft of the cooking chamber; a pin on the worm wheel capable of engaging the grooved disk; a worm wheel shaft; a pivotally mounted and spring controlled latch on the worm wheel; a rotatable mold cover actuating cam having a notch in its periphery with which the latch is capable of engaging, and freely mounted on the worm wheel shaft; levers capable of automatically engaging with and unlocking the mold covers as they approach the top position, and locking them as they move therefrom; mechanism connected with the levers and actuated by the mold cover actuating means for opening and closing the mold covers after they have been unlocked; a liquid reservoir capable of being moved to and from a position directly above the cooking molds; stop devices for the liquid reservoir; a rotatable liquid reservoir actuating cam arranged on the same shaft as the mold cover actuating cam; rotatable clutch mechanism; links connecting the clutch mechanism with the liquid reservoir; levers connected with the clutch mechanism and operated by the reservoir actuating cam; a hand actuated lever capable of engaging and disengaging the clutch mechanism; mechanism connected with the hand lever for automatically moving the latch out of engagement with the mold cover cam; a locking plate having projections on its face and operated by the mold cover mechanism; and means for engaging with the projections on the locking plate and connected with the hand actuated lever for preventing the clutch mechanism connected with the liquid reservoir being actuated other than at the predetermined time.

In testimony whereof, I affix my signature, in presence of two witnesses.

THOMAS OWEN BATES.

Witnesses:
S. J. EARL,
H. D. JAMESON.